US007407999B2

United States Patent

(12) United States Patent
Tsou et al.
(10) Patent No.: US 7,407,999 B2
(45) Date of Patent: Aug. 5, 2008

(54) LOW PERMEABILITY NANOCOMPOSITES

(75) Inventors: Andy Haishung Tsou, Houston, TX (US); Anthony Jay Dias, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 323 days.

(21) Appl. No.: 10/476,936

(22) PCT Filed: May 29, 2002

(86) PCT No.: PCT/US02/16794

§ 371 (c)(1),
(2), (4) Date: Nov. 6, 2003

(87) PCT Pub. No.: WO02/100923

PCT Pub. Date: Dec. 19, 2002

(65) Prior Publication Data

US 2005/0032937 A1 Feb. 10, 2005

Related U.S. Application Data

(60) Provisional application No. 60/296,873, filed on Jun. 8, 2001.

(51) Int. Cl.
*C08K 9/00* (2006.01)
*C08K 3/00* (2006.01)

(52) U.S. Cl. ...................... 524/445; 524/186; 524/447; 501/145

(58) Field of Classification Search ................ 523/216, 523/200; 524/445, 447, 186; 501/145
See application file for complete search history.

(56) References Cited

U.S. PATENT DOCUMENTS

| | | | | |
|---|---|---|---|---|
| 4,173,556 A | 11/1979 | Coran et al. | ............ | 260/30.8 R |
| 4,197,379 A | 4/1980 | Coran et al. | ............... | 525/142 |
| 4,207,404 A | 6/1980 | Coran et al. | ............... | 525/184 |
| 4,297,453 A | 10/1981 | Coran et al. | ............... | 525/408 |
| 4,338,413 A | 7/1982 | Coran et al. | ............... | 525/179 |
| 4,348,502 A | 9/1982 | Coran et al. | ............... | 525/183 |
| 4,419,499 A | 12/1983 | Coran et al. | ............... | 525/424 |
| 4,454,304 A | 6/1984 | Tsai | .......................... | 525/210 |
| 5,162,445 A * | 11/1992 | Powers et al. | ........... | 525/333.4 |
| 5,227,426 A * | 7/1993 | Tse et al. | ................... | 524/534 |
| 5,333,662 A * | 8/1994 | Costemalle et al. | ......... | 152/510 |
| 5,504,164 A * | 4/1996 | O'Donnell | ................. | 525/346 |
| 5,548,029 A * | 8/1996 | Powers et al. | .............. | 525/195 |
| 5,569,716 A | 10/1996 | Okamoto et al. | ........... | 525/192 |
| 5,576,372 A | 11/1996 | Kresge et al. | .............. | 524/442 |
| 5,576,373 A | 11/1996 | Kresge et al. | .............. | 524/445 |
| 5,665,183 A | 9/1997 | Kresge et al. | .............. | 152/204 |
| 5,807,629 A | 9/1998 | Elspass et al. | ............. | 428/323 |
| 5,851,323 A | 12/1998 | Kaido et al. | ............... | 152/510 |
| 5,883,173 A | 3/1999 | Elspass et al. | ............. | 524/446 |
| 5,910,544 A | 6/1999 | Ozawa et al. | .............. | 525/178 |
| 5,936,023 A | 8/1999 | Kato et al. | ................. | 524/445 |
| 5,936,039 A | 8/1999 | Wang et al. | ................ | 525/178 |
| 5,938,869 A | 8/1999 | Kaido et al. | ............... | 152/510 |
| 5,952,093 A | 9/1999 | Nichols et al. | ............. | 428/323 |
| 5,973,053 A | 10/1999 | Usuki et al. | ................ | 524/445 |
| 6,028,147 A | 2/2000 | Ogawa et al. | .............. | 525/292 |
| 6,034,164 A | 3/2000 | Elspass et al. | ............. | 524/445 |
| 6,036,765 A | 3/2000 | Farrow et al. | .............. | 106/487 |
| 6,060,549 A | 5/2000 | Li et al. | ..................... | 524/445 |
| 6,060,563 A | 5/2000 | Peiffer et al. | ............... | 525/213 |
| 6,062,283 A | 5/2000 | Watanabe et al. | .......... | 152/510 |
| 6,069,202 A | 5/2000 | Venkataswamy et al. | ...... | 525/66 |
| 6,079,465 A | 6/2000 | Takeyama et al. | .......... | 152/510 |
| 6,087,016 A | 7/2000 | Feeney et al. | ............. | 428/454 |
| 6,103,817 A | 8/2000 | Usuki et al. | ................ | 524/574 |
| 6,140,424 A | 10/2000 | Patel et al. | ................. | 525/221 |
| 6,232,389 B1 | 5/2001 | Feeney et al. | .............. | 524/450 |
| 6,339,121 B1 * | 1/2002 | Rafailovich et al. | ......... | 524/445 |
| 6,359,071 B1 | 3/2002 | Watanabe et al. | .......... | 525/184 |
| 6,710,116 B1 * | 3/2004 | Waddell et al. | ............ | 524/515 |

(Continued)

FOREIGN PATENT DOCUMENTS

| | | |
|---|---|---|
| EP | 0722850 | 7/1996 |

(Continued)

OTHER PUBLICATIONS

Material Data Sheet for "Cloisite 25A".2MHTL8: dimethyl, hydrogenatedtallow, 2-ethylhexyl quatemary ammonium [online]. Southern Clay Products, Inc (SCP). [retrieved on Jan. 13, 2006]. Retrieved from <URL: http://www.nanoclay.com/data/25A.htm>.*

(Continued)

*Primary Examiner*—Katarzyna Wyrozebski
(74) *Attorney, Agent, or Firm*—Nancy T. Krawczyk; Xiaobing Feng; Kevin M. Faulkner

(57) ABSTRACT

The present invention is a blend of a thermoplastic engineering resin and an interpolymer of, on one embodiment, a $C_4$ to $C_7$ isomonoolefin, a para-methylstyrene and a para-(halomethylstyrene), the interpolymer having been pre-mixed with an exfoliated-clay, the entire blend forming a nanocomposite. The resin may or may not have a clay present prior to blending with the interpolymer. The interpolymer/clay mixture forms a distinct phase in the nanocomposite blend of the invention. The blend of the invention has improved air barrier properties and is suitable as an air barrier.

43 Claims, No Drawings

U.S. PATENT DOCUMENTS

| | | | | |
|---|---|---|---|---|
| 2001/0041762 | A1 | 11/2001 | Ikawa et al. | 524/262 |
| 2002/0018492 | A1 | 2/2002 | Sakai et al. | 370/512 |

FOREIGN PATENT DOCUMENTS

| | | |
|---|---|---|
| EP | 0842793 | 5/1998 |
| EP | 0854054 | 7/1998 |
| EP | 0969039 | 1/2000 |
| EP | 1055706 | 11/2000 |
| EP | 1145872 | 10/2001 |
| WO | WO01/96466 | 12/2001 |
| WO | WO02/14410 | 2/2002 |

OTHER PUBLICATIONS

Lewis, Richard J., Sr. (2002). Hawley's Condensed Chemical Dictionary (14th Edition). John Wiley & Sons. "Amine".*

Japanese Unexamined Application P2000-160024A, Yuichi et al., Jun. 13, 2000.

D. J. Suh, et al., "The property and formation mechanism of unsaturated polyester-layered silicate nanocomposite depending on the fabrication methods" Polymer, Elsevier Science Publishers B.V., GB, vol. 41, No. 24, Nov. 1999, pp. 8557-8563.

* cited by examiner

LOW PERMEABILITY NANOCOMPOSITES

CROSS REFERENCE TO RELATED APPLICATIONS

This application is a National Stage Application of International Application No. PCT/US02/16794, filed May 29, 2002, which claims the benefit of Provisional Application Ser. No. 60/296,873, filed Jun. 8, 2001.

FIELD OF THE INVENTION

The present invention provides low-permeability nanocomposites which are blends of thermoplastics and elastomers, vulcanized or unvulcanized, in which the elastomer component contains nano-fillers such as clays.

BACKGROUND

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability; especially a dynamically vulcanized thermoplastic nanocomposite such as used in the manufacture of tires.

Dynamically vulcanized thermoplastic compositions comprising a polyamide and various types of elastomers are known. See, for example, U.S. Pat. No. 4,173,556; U.S. Pat. No. 4,197,379; U.S. Pat. No. 4,207,404; U.S. Pat. No. 4,297,453; U.S. Pat. No. 4,338,413; U. 4,348,502; U.S. Pat. No. 4,419,499, and U.S. Pat. No. 6,028,147. The term "dynamic vulcanization" is used herein to mean a vulcanization process in which the components of the blend are vulcanized under conditions of high shear. As a result, the vulcanizable elastomer is simultaneously crosslinked and dispersed as fine particles of a "micro gel" within the resin matrix.

Dynamic vulcanization is effected by mixing, for example, an elastomer and a thermoplastic, at a temperature which is at or above the curing temperature of the polymer in equipment to provide high shear such as roll mills, Banbury™ mixers, continuous mixers, kneaders or mixing extruders, extruders. One unique characteristic of the dynamically cured compositions is that, notwithstanding the fact that the polymer component may be fully cured, the compositions can be processed and reprocessed by conventional rubber processing techniques such as extrusion, injection molding, compression molding, etc. Scrap or flashing can be salvaged and reprocessed.

It is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isomonoolefin and a para-methylstyrene and a para-(halomethylstyrene), the blend also including nylon containing exfoliated-clays that are used as a high impact material. Further, Japanese Unexamined Application P2000-160024 to Yuichi et al. discloses a thermoplastic elastomer composition which can be used as an air barrier. The nanocomposite in Yuichi et al. includes is blend similar to that disclosed in Li et al. Other disclosures include U.S. Pat. No. 6,036,765 and EP 1 055 706 A.

There is still a problem of achieving a nanocomposite suitable for an air barrier, in particular, an air barrier incorporating the copolymer of a $C_4$ to $C_7$ isomonoolefin and a para-methylstyrene and a para-(halomethylstyrene). While enhancing the impact properties and abrasion resistance of plastics such as polyamides, this copolymer tends to be a poor air barrier as compared with that of polyamide alone or other low-permeability plastic matrices. What is needed is a blend of a thermoplastic resin such as nylon with the copolymer to form a nanocomposite suitable as an air barrier.

SUMMARY OF THE INVENTION

An embodiment of the present invention includes a blend of a thermoplastic engineering resin and an interpolymer of a $C_4$ to $C_7$ isomonoolefin, a para-methylstyrene and a para-(halomethylstyrene) that has been pre-mixed with a clay, the blend forming a nanocomposite. The resin may or may not have a clay present prior to blending with the interpolymer. In another embodiment, the interpolymer is not pre-mixed with the clay. The interpolymer/clay mixture form a distinct phase in the nanocomposite blend of the invention. The blend of the invention has improved air barrier properties.

One embodiment of the invention is a nanocomposite comprising having at least two phases, wherein:

a) one phase is at least one thermoplastic engineering resin; and b) another phase is a blend of an alkylamine-exfoliated clay and an interpolymer of a $C_4$ to $C_7$ isomonoolefin containing up to 20 mole % of the following aromatic monomer units randomly spaced along the polymer chain:

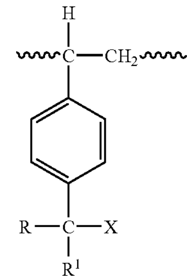

wherein R and $R^1$ are independently hydrogen, $C_4$ to $C_7$ alkyl or primary or secondary alkyl halides and X is hydrogen, or a functional group selected from the group consisting of halogens; carboxy acids; carboxy salts; carboxy esters, amides and imides; hydroxy; alkoxide; phenoxide; thiolate; thioether; xanthate; cyanide; cyanate; amino and mixtures thereof.

DETAILED DESCRIPTION OF THE INVENTION

The thermoplastic engineering resins suitable for practice of the present invention may be used singly or in combination and are resins containing nitrogen, oxygen, halogen, sulfur or other groups capable of interacting with an aromatic functional groups such as halogen or acidic groups. The resins are present in the nanocomposite from 30 to 90 wt % of the nanocomposite in one embodiment, and from 40 to 80 wt % in another embodiment, and from 50 to 70 wt % in yet another embodiment. In yet another embodiment, the resin is present at a level of greater than 40 wt % of the nanocomposite, and greater than 60 wt % in another embodiment.

Suitable engineering resins include resins selected from polyolefins (polypropylene, polyethylene, etc.), polyamides, polyimides, polycarbonates, polyesters, polysulfones, polylactones, polyacetals, acrylonitrile-butadiene-styrene resins (ABS), polyphenyleneoxide (PPO), polyphenylene sulfide. (PPS), polystyrene, styrene-acrylonitrile resins (SAN), styrene maleic anhydride resins (SMA), aromatic polyketones (PEEK, PED, and PEKK) and mixtures thereof. In another embodiment, suitable engineering resins include resins selected from polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, laurylIactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 ENCYCLOPEDIA OF CHEMICAL TECHNOLOGY 1-105 (John Wiley & Sons 1968), CONCISE ENCYCLOPEDIA OF POLYMER SCIENCE AND ENGINEERING 748-761 (John Wiley & Sons, 1990), and 10 ENCYCLOPEDIA OF POLYMER SCIENCE AND TECHNOLOGY 392-414 (John Wiley & Sons 1969). Commercially available thermoplastic polyamides may be advantageously used in the practice of this invention, with linear crystalline polyamides having a softening point or melting point between 160 and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene), $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexane-di-methylene) oxlate and poly-(cis-1,4-cyclohexane-di-methylene) succinate, poly ($C_{2-4}$ alkylene terephthalates) such as polyethyleneterephthalate and polytetramethylene-terephthalate, poly ($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and blends with polystyrene are further described in U.S. Pat. No. 3,383,435.

Other thermoplastic resins which may be used include the polycarbonate analogs of the polyesters described above such as segmented poly (ether co-phthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ $\alpha$-olefins, in one embodiment a homopolymer of propylene derived units, and in another embodiment a random copolymer or block copolymer of ethylene derived units and propylene derived units, and like engineering resins as are known in the art.

The interpolymers suitable for compositions of the present invention in one embodiment of the invention are random elastomeric copolymers of a $C_4$ to $C_7$ isomonoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ $\alpha$-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

1.

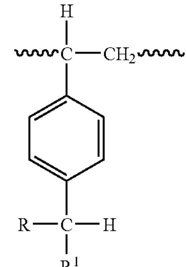

2.

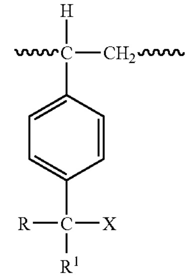

wherein R and $R^1$ are independently hydrogen, lower alkyl, preferably $C_1$ to $C_7$ alkyl and primary or secondary alkyl halides and X is a functional group such as halogen. Preferably R and $R^1$ are each hydrogen. Up to 60 mole % of the para-substituted styrene present in the interpolymer structure may be the functionalized structure (2) above in one embodiment, and in another embodiment from 0.1 to 5 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and para-methylstyrene containing from 0.5 to 20 mole % para-methylstyrene wherein up to 60 mole % of the methyl substituent groups present on the benzyl ring contain a bromine or chlorine atom, preferably a bromine atom (para-(bromomethylstyrene)), as well as acid or ester functionalized versions.

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer. Desirable interpolymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The interpolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMS polymers are brominated polymers that generally contain from 0.1 to 5% mole of bromomethylstyrene groups relative to the total amount of monomer derived units in the polymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, preferred copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mol % based on the total number of para-methylstyrene, and wherein the para-methylstyrene derived units are present from 3 wt % to 15 wt % based on the total weight of the polymer in one embodiment, and from 4 wt % to 10 wt % in another embodiment. In another embodiment, the para-(halomethylstyrene) is para-(bromomethylstyrene).

The elastomeric functionalized interpolymer is incorporated into the nanocomposite at a level sufficient to enhance the impact properties of the plastic matrix, such as, for example, generally at a level of from 0.5 to less than 60 wt % in one embodiment, from 5 to 50 wt % in another embodiment, and from 10 to 40 wt % in yet another embodiment, based on the total polymer content of the composition, or at a level sufficient to render the nanocomposite as a thermoplastic elastomer, that is, generally at a level of from 35 to 99.5 wt % in one embodiment, or from 40 to 80 wt % in another embodiment, and from 45 to 75 wt % in yet another embodiment.

Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay may be intercalated by treatment with organic molecules (variously, swelling agents, or exfoliating "agents" or "additives") capable of undergoing ion exchange reactions with the cations present at the interlayer surfaces of the layered silicate. This treatment is alternately referred to as "exfoliation". Suitable exfoliating agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

Desirable amine additives (or the corresponding ammonium ion) useful for blending or "exfoliating" with clays as swelling agents useful in the invention are those with the structure $R^2R^3R^4N$, wherein $R^2$, $R^3$, and $R^4$ are $C_1$ to $C_{20}$ alkyls or alkenes which may be the same or different. In one embodiment, the exfoliating agent is a so called long chain tertiary amine, wherein at least $R^2$ is a $C_{14}$ to $C_{20}$ alkyl or alkene.

Another class of exfoliating additives include those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

The exfoliating additive such as described herein is present in the composition in an amount to achieve the desired properties. For example, the additive may be blended with the terpolymer and other additives such as curatives from 0.1 to 30 phr in one embodiment, and from 0.2 to 20 phr in yet another embodiment, and from 0.3 to 15 phr in yet another embodiment. Stated another way, the amount of exfoliated clay incorporated in the nanocomposites in accordance with this invention is sufficient to develop an improvement in the mechanical properties of the nanocomposite, for example, flexural modulus and tensile strength. Preferred amounts generally will range from 0.5 to 10 wt % in one embodiment, and from 1 to 5 wt % in another embodiment, based on the polymer content of the nanocomposite. In one embodiment, the exfoliated clay is an alkylamine-exfoliated clay.

The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment. Desirably, the clay is pre-treated with the exfoliating additive prior to addition to the terpolymer and thermoplastic.

Treatment with the swelling additives described above results in intercalation of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art. The compositions of the invention may also include secondary rubbers or "general purpose rubbers" such as, for example, natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene) and mixtures thereof.

Blending of the components may be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite. Alternatively, the clay may be separately combined with the engineering resin or elastomer by melt mixing, followed by extrusion of the blend or nanocomposite. If the mixture is to be dynamically vulcanized, before or after the resin and the elastomeric copolymer have been intimately mixed, the curative or curatives are added. Heating and masticating at vulcanization temperatures of 180° C. to 300° C. are generally adequate to complete vulcanization in 0.10 to 10 minutes.

A more complete description of the preparation of dynamically vulcanized compositions is found in WO 92/02582, the disclosure of which is incorporated herein by reference.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability.

Thus, the present invention is a nanocomposite comprising at least a first and second phase, the first phase a mixture of an interpolymer comprising $C_4$ to $C_7$ isomonoolefin derived units, a para-methylstyrene derived units and a para-(halomethylstyrene) derived units with an alkylamine-exfoliated clay; and the second phase a thermoplastic engineering resin. The phases form a dispersion of "particles" having a measurable size based on such techniques as AFM. The invention is not herein limited to the shape of the particles. The composition is useful for such applications as listed above, and is particularly useful in air barriers such as pneumatic tire components, for example, innerliners, innertubes, and other air barriers such as bladders, etc.

In one embodiment of the composition, the second phase also includes an alkylamine-exfoliated clay. Desirable alkylamine compounds (or the corresponding ammonium ion) useful for blending or "exfoliating" with clays as swelling agents useful in the invention are those with the structure $R^2R^3R^4N$, wherein $R^2$, $R^3$, and $R^4$ are $C_1$ to $C_{20}$ alkyls or alkenes which may be the same or different. In one embodiment, the exfoliating agent is a so called long chain tertiary amine, wherein at least $R^2$ is a $C_{14}$ to $C_{20}$ alkyl or alkene.

In a desirable embodiment, the alkylamine-exfoliated clay is a di-methyl tallowalkyl octyl ammonia methyl sulfate-exfoliated clay, and a di-methyl di-hydrogenated tallow alkyl ammonia chloride-exfoliated clay in another embodiment; and wherein the alkylamine-exfoliated clay is present in the nanocomposite from 0.5 to 10 wt % in yet another embodiment.

In one embodiment, the thermoplastic resin is selected from polyolefins, polyamides, polyimides, polyesters, polycarbonates, polysulfones, polylactones, polyacetals, acrylonitrile/butadiene/styrene copolymer resins, polyphenylene oxides, polyphenylene sulfides, polystyrene, styrene/acrylonitrile copolymer resins, styrenelmaleic anhydride copolymer resins, aromatic polyketones and mixtures thereof.

In one embodiment, the interpolymer is present in the nanocomposite from 10 to 40 wt %.

In another embodiment, the thermoplastic engineering resin is present in the nanocomposite from 30 to 90 wt %.

In another embodiment, the composition includes one or more curing agents selected from metals, metal oxides, and metal-carboxylic acid (fatty acid) compounds such as zinc, zinc stearate, stearic acid, sulfur, and mixtures thereof.

In another embodiment, the nanocomposite can be described as having at least two phases, wherein one phase includes at least one thermoplastic engineering resin; and another phase includes a blend of an alkylamine-exfoliated clay and an interpolymer of a $C_4$ to $C_7$ isomonoolefin containing up to 20 mole % of the following aromatic monomer units randomly spaced along the polymer chain:

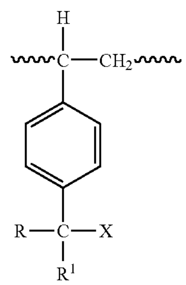

wherein R and $R^1$ are independently hydrogen, $C_1$ to $C_4$ alkyl or primary or secondary alkyl halides and X is hydrogen, or a functional group selected from the group consisting of halogens; carboxylic acids; carboxy salts; carboxy esters, amides and imides; hydroxy; alkoxide; phenoxide; thiolate; thioether; xanthate; cyanide; cyanate; amino and mixtures thereof. In another embodiment, the thermoplastic resin phase also includes an alkylamine-exfoliated clay.

The compositions of the invention can be characterized in one embodiment in that the blend is a dispersion of particles, wherein the number average size of the particles in the blend as measured by AFM is from 0.30 to 0.65 microns in one embodiment, and from 0.35 to 0.60 microns in another embodiment.

The nanocomposites may be further characterized in having improved air barrier qualities when measure by the test method above, wherein the oxygen permeability of the elastomer/thermoplastic blend ranges from less than $3.0\times10^{-8}$ cc-mil/$m^2$-day-mmHg in one embodiment (at 60° C.), and less than $2.0\times10^{-8}$ cc-mil/$m^2$-day-mmHg in another embodiment, and between $3.0\times10^{-8}$ cc-mil/$m^2$-day-mmHg and $0.5\times10^{-8}$ cc-mil/$m^2$-day-mmHg in yet another embodiment.

The invention also includes a method of forming a nanocomposite comprising forming a first phase of an alkylamine-exfoliated clay and an interpolymer of $C_4$ to $C_7$ isomonoolefin derived units, a para-methylstyrene derived units and a para-(halomethylstyrene) derived units; then blending the first phase with at least a second phase comprising a thermoplastic engineering resin. The first phase may be formed by any suitable means such as blending in a Brabender™ or Banbury™ or other suitable blender such as a dispersion of materials is achieved. The first and second phases are blended by any suitable means as described herein.

The following examples are illustrative of the invention.

TEST METHODS & EXAMPLES

Materials used in the blends in the examples are shown in Table 1. A series of formulations were prepared by compounding polyamide resin and brominated isobutylene/para-methylstyrene elastomer (BIMS) present at various levels as shown in Table 2 (phr), then blended with the nylon in various amounts shown in Table 3 (wt %). The values in Table 2 in phr (parts per hundred rubber) can be converted to wt % by dividing each value by the total amount of components, in the present case 124. Thus, in Table 2, the equivalent value of BIMS expressed as a weight percent is 100/124, or 0.806 (80.6 wt %) of the BIMS/clay phase.

Permeability Testing. All specimens were compression molded with slow cooling to provide defect free pads. A compression and curing press was used for rubber samples. Typical thickness of a compression molded pad is around 15 mil. using an Arbor press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 60° C. under the principle of R. A. Pasternak et. al. in 8 JOURNAL OF POLYMER SCIENCE: PART A-2 467 (1970). Disks thus prepared were mounted on a template and sealed with a vacuum grease. 10 psi nitrogen was kept on one side of the disk, whereas the other side is 10 psi oxygen. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen permeability. Permeability values are multiplied by $10^8$ as expressed in the tables unless stated otherwise noted.

Tapping Phase Atomic Force Microscopy. All specimens were analyzed within 8 hours after cryofacing to prevent specimen relaxation. During cryofacing, the specimens were cooled to −150° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vice for AFM analysis. The AFM measurements were performed in air on a NanoScope Dimension 3000 scanning probe microscope (Digital Instrument) using a rectangular Si cantilever. AFM phase images of all specimens were converted into a TIFF format and processed using PHOTOSHOP™ (Adobe Systems, Inc.). The image processing tool kit (Reindeer Games, Inc.) was applied for image measurements. Results of image measurements were written into a text file for subsequent data processing using EXCEL™.

Mixing BIMS with Cloisite clays to form a first phase of the final nanocomposite, and curatives, was performed using a Banbury™ mixer. It is understood that any number of curatives or additives can be used, and the invention is not limited as such. Compositions of these mixes are listed in Table 2. All BIMS blends were cured to prepare pads for permeability measurement using a Mocon permeability tester. Oxygen permeability values at 60° C. were measured for these cured pads. The permeability value (in cc-mil/$m^2$-day-mmHg) for the BIMS sample is 20.5, while the values for the BIMS-1 through BIMS-3 samples range from 23 to 14, showing some reduction. The values of the BIMS-4 through BIMS-6 samples ranged from 17.3 to 18.6, thus showing generally more reduction in air permeability for the blends in Table 2. Adding 20 phr of clays would lower the permeability of BIMS rubber by 10 to 30%. TEM images of these clay containing BIMS rubbers revealed that a mixture of clay dispersion states is present, including undispersed clays, intercalated clays, and few exfoliated clays.

Further reduction in permeability was achieved by blending BIMS with low-permeability Nylon 6/66 with or without clays, the nylon forming another or second phase of the final nanocomposite. BIMS rubbers with or without clays as described in Table 2 were cut into strips to be fed into a Brabender™ mixer at 220° C. Due to the presence of curatives in BIMS, dynamic vulcanization occurred during blending in the Brabender™ mixer at 60 RPM for 5 minutes. Fine BIMS dispersions were observed by AFM and image processing. Number average sizes of BIMS dispersions in equivalent diameter range from 0.37 to 0.57 microns. The AFM confirms the presence of two phases in the nanocomposite resulting from the mixture of the BIMS/clay phase and the nylon phase. The dynamic vulcanized blend compositions are listed in Table 3 and their permeability values are tabulated in Table 4. As indicated in Table 4, mixing BIMS with Nylon in 30/70 ratio without clays could provide 92% reduction in permeability. It is also desirable to add clays to the nylon phase in another embodiment of the invention. By adding clays in both Nylon and BIMS, 97% reduction in permeability could be realized.

Embodiments of the final nanocomposite of the present invention are useful as air barriers, such as used in producing innerliners for motor vehicles. In particular, the nanocomposites are useful in innerliners in articles such as truck tires, bus tires, passenger automobile, motorcycle tires, off the road tires, and the like. The improved heat aging resistance of the present innerliner composition makes it particularly suited for use in truck tires to increase the retreading capability of the tire.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Material Description

| Designation | Description | Material |
|---|---|---|
| BIMS | BIMS 89-4 rubber, 45 ML[1], 0.75 mol % Br, 5 wt % PMS | EXXPRO 89-4, ExxonMobil Chemical |
| 6/66 | 80/20 wt % copolymer of Nylon 6 and 66 | Ube 5034B, Ube Industries, Inc. |
| 6/66C | 80/20 wt % copolymer of Nylon 6 and 66 containing 2 wt % of exfoliated montmorillonite clay | Ube 5034C2, Ube Industries, Inc. |
| 6A | Montmorillonite clay treated with di-methyl di-hydrogenated tallow alkyl ammonia chloride | Cloisite 6A, Southern Clay |
| 25 A | Montmorillonite clay treated with di-methyl tallowalkyl octyl ammonia methyl sulfate | Cloisite 25 A, Southern Clay |

[1]ML is Mooney Viscosity (1 + 8) measured at 125° C. and 1 $s^{-1}$.

TABLE 2

BIMS Elastomers with Clays

| Component (phr) | BIMS | BIMS-1 | BIMS-2 | BIMS-3 | BIMS-4 | BIMS-5 | BIMS-6 |
|---|---|---|---|---|---|---|---|
| BIMS | 100 | 100 | 100 | 100 | 100 | 100 | 100 |
| 6A | 0 | 5 | 10 | 20 | 0 | 0 | 0 |
| 25A | 0 | 0 | 0 | 0 | 5 | 10 | 20 |
| ZnO | 1 | 1 | 1 | 1 | 1 | 1 | 1 |
| Zn stearate | 1 | 1 | 1 | 1 | 1 | 1 | 1 |
| Stearic acid | 2 | 2 | 2 | 2 | 2 | 2 | 2 |

TABLE 3

BIMS/Nylon Blends

| Component (wt %) | B1 | B2 | B3 | B4 | B5 | B6 | B7 | B8 | B9 | B10 | B11 | B12 | B13 | B14 |
|---|---|---|---|---|---|---|---|---|---|---|---|---|---|---|
| 6/66 | 70 | 70 | 70 | 70 | 70 | 70 | 70 | 0 | 0 | 0 | 0 | 0 | 0 | 0 |
| 6/66C | 0 | 0 | 0 | 0 | 0 | 0 | 0 | 70 | 70 | 70 | 70 | 70 | 70 | 70 |
| BIMS | 0 | 0 | 0 | 0 | 0 | 0 | 30 | 0 | 0 | 0 | 0 | 0 | 0 | 30 |
| BIMS1 | 30 | 0 | 0 | 0 | 0 | 0 | 0 | 30 | 0 | 0 | 0 | 0 | 0 | 0 |
| BIMS2 | 0 | 30 | 0 | 0 | 0 | 0 | 0 | 0 | 30 | 0 | 0 | 0 | 0 | 0 |
| BIMS3 | 0 | 0 | 30 | 0 | 0 | 0 | 0 | 0 | 0 | 30 | 0 | 0 | 0 | 0 |
| BIMS4 | 0 | 0 | 0 | 30 | 0 | 0 | 0 | 0 | 0 | 0 | 30 | 0 | 0 | 0 |
| BIMS5 | 0 | 0 | 0 | 0 | 30 | 0 | 0 | 0 | 0 | 0 | 0 | 30 | 0 | 0 |
| BIMS6 | 0 | 0 | 0 | 0 | 0 | 30 | 0 | 0 | 0 | 0 | 0 | 0 | 30 | 0 |

TABLE 4

Permeability values of BIMS/Nylon Blends

| Blends | Permeability[1] |
|---|---|
| B1 | 1.681 |
| B2 | 1.500 |
| B3 | 1.281 |
| B4 | 1.821 |
| B5 | 1.398 |
| B6 | 0.911 |
| B7 | 1.732 |
| B8 | 0.772 |
| B9 | 0.857 |
| B10 | 0.644 |
| B11 | 0.852 |
| B12 | 0.709 |
| B13 | 0.690 |
| B14 | 1.131 |

[1]Permeability values are in unit of cc-mil/$m^2$-day-mmHg

We claim:

1. A nanocomposite comprising at least a first and second phase prepared by a method comprising forming the first and second phases, and blending the first and second phases, the first phase comprising a mixture of an interpolymer comprising $C_4$ to $C_7$ isomonoolefin derived units, para-methylstyrene derived units and para-(halomethylstyrene) derived units with an alkylamine-exfoliated or an alkylammonium-exfoliated clay; the second phase comprising at least one thermoplastic engineering resin containing an alkylamine-exfoliated or an alkylammonium-exfoliated clay.

2. The nanocomposite of claim 1, wherein the thermoplastic resin is selected from the group consisting of polyamides, polyimides, polyesters, polycarbonates, polysulfones, polylactones, polyacetals, acrylonitrile/butadiene/styrene copolymer resins, polyphenylene oxides, polyphenylene sulfides, polystyrene, styrene/acrylonitrile copolymer resins, styrene/maleic anhydride copolymer resins, aromatic polyketones and mixtures thereof.

3. The nanocomposite of claim 1, wherein the interpolymer is present in the nanocomposite from 10 to 40 wt % based on the weight of the nanocomposite.

4. The nanocomposite of claim 1, wherein the thermoplastic engineering resin is present in the nanocomposite from 30 to 90 wt % based on the weight of the nanocomposite.

5. The nanocomposite of claim 1, wherein the alkylammonium-exfoliated clay in the first phase is a di-methyl tallowalkyl octyl ammonium methyl sulfate-exfoliated clay.

6. The nanocomposite of claim 1, wherein the alkylamine-exfoliated or alkylammonium-exfoliated clay is present in the nanocomposite from 0.5 to 10 wt % based on the weight of the nanocomposite.

7. The nanocomposite of claim 1, wherein the alkylammonium-exfoliated clay in the first phase is a di-methyl di-hydrogenated tallow alkyl ammonium chloride-exfoliated clay.

8. The nanocomposite of claim 1, further comprising curing agents.

9. The nanocomposite of claim 8, wherein the curing agents are selected from the group consisting of zinc, zinc stearate, stearic acid, sulfur, and mixtures thereof.

10. The nanocomposite of claim 1, wherein the nanocomposite is a dispersion of particles, wherein the number average size of the particles in the dispersion as measured by AFM is from 0.30 to 0.65 microns.

11. The nanocomposite of claim 1, wherein the oxygen permeability of the nanocomposite is less than $2.0 \times 10^{-8}$ cc-mil/$m^2$-day-mmHg.

12. A tire innerliner comprising the nanocomposite of claim 1.

13. The nanocomposite of claim 1 wherein the first phase comprises the alkylammonium-exfoliated clay.

14. The nanocomposite of claim 1 wherein the second phase comprises the alkylamine-exfoliated clay.

15. The nanocomposite of claim 13 wherein the second phase comprises the alkylamine-exfoliated clay.

16. A nanocomposite comprising at least two phases, wherein:

a) one phase comprises an alkylamine-exfoliated or an alkylammonium-exfoliated clay and at least one thermoplastic engineering resin; and b) another phase comprises a blend of an alkylamine-exfoliated or an alkylammonium-exfoliated clay and an interpolymer of a $C_4$ to $C_7$ isomonoolefin containing up to 20 mole % of the following aromatic monomer units randomly spaced along the polymer chain:

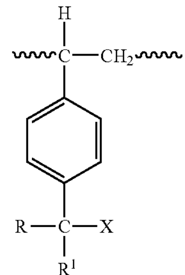

wherein R and $R^1$ are independently hydrogen, $C_1$ to $C_4$ alkyl or primary or secondary alkyl halides and X is hydrogen, or a functional group selected from the group consisting of halogens; carboxylic acids; carboxy salts; carboxy esters, amides and imides; hydroxy; alkoxide; phenoxide; thiolate; thioether; xanthate; cyanide; cyanate; amino and mixtures thereof;

wherein the nanocomposite is made by a method comprising blending the alkylamine-exfoliated or alkylammonium-exfoliated clay-containing thermoplastic resin phase with the alkylamine-exfoliated or alkylammonium-exfoliated clay-containing interpolymer phase.

17. The nanocomposite of claim 16, wherein the thermoplastic resin is selected from the group consisting of polyamides, polyimides, polyesters, polycarbonates, polysulfones, polylactones, polyacetals, acrylonitrile/butadiene/styrene copolymer resins, polyphenylene oxides, polyphenylene sulfides, polystyrene, styrene/acrylonitrile copolymer resins, styrene/maleic anhydride copolymer resins, aromatic polyketones and mixtures thereof.

18. The nanocomposite of claim 16, wherein the interpolymer is present in the nanocomposite from 10 to 40 wt % based on the weight of the nanocomposite.

19. The nanocomposite of claim 16, wherein the thermoplastic engineering resin is present in the nanocomposite from 30 to 90 wt % based on the weight of the nanocompo site.

20. The nanocomposite of claim 16, wherein the alkylammonium-exfoliated clay in the interpolymer phase is a dimethyl tallowalkyl octyl ammonium methyl sulfate-exfoliated clay.

21. The nanocomposite of claim 16, wherein the alkylamine-exfoliated or alkylammonium-exfoliated clay is present in the nanocomposite from 0.5 to 10 wt % based on the weight of the nanocomposite.

22. The nanocomposite of claim 16, wherein the alkylammonium-exfoliated clay in the interpolymer phase is a dimethyl di-hydrogenated tallow alkyl ammonium chloride-exfoliated clay.

23. The nanocomposite of claim 16, also comprising curing agents.

24. The nanocomposite of claim 23, wherein the curing agents are selected from the group consisting of zinc, zinc stearate, stearic acid, sulfur, and mixtures thereof.

25. The nanocomposite of claim 16, wherein the nanocomposite is a dispersion of particles, wherein the number average size of the particles in the dispersion as measured by AFM is from 0.30 to 0.65 microns.

26. The nanocomposite of claim 16, wherein the oxygen permeability of the nanocomposite is less than $2.0 \times 10^{-8}$ c-mil/$m^2$-day-mmHg.

27. A tire innerliner comprising the nanocomposite of claim 16.

28. The nanocomposite of claim 16 wherein the thermoplastic resin phase comprises the alkylammonium-exfoliated clay.

29. The nanocomposite of claim 16 wherein the interpolymer phase comprises the alkylamine-exfoliated clay.

30. The nanocomposite of claim 28 wherein the interpolymer phase comprises the alkylamine-exfoliated clay.

31. A method of forming a nanocomposite comprising forming a first phase of an alkylamine-exfoliated or an alkylammonium-exfoliated clay and an interpolymer of $C_4$ to $C_7$ isomonoolefin derived units, para-methylstyrene derived units and para-(halomethylstyrene) derived units; and blending the first phase with at least a second phase comprising a thermoplastic engineering resin also including an alkylamine-exfoliated or an alkylammonium-exfoliated clay.

32. The method of claim 31, wherein the thermoplastic resin is selected from the group consisting of polyamides, polyimides, polyesters, polycarbonates, polysulfones, polylactones, polyacetals, acrylonitrile/butadiene/styrene copolymer resins, polyphenylene oxides, polyphenylene sulfides, polystyrene, styrene/acrylonitrile copolymer resins, styrene/maleic anhydride copolymer resins, aromatic polyketones and mixtures thereof.

33. The method of claim 31, wherein the interpolymer is present in the nanocomposite from 10 to 40 wt % based on the weight of the nanocomposite.

34. The method of claim 31, wherein the thermoplastic engineering resin is present in the nanocomposite from 30 to 90 wt % based on the weight of the nanocomposite.

35. The method of claim 33, wherein the alkylammonium-exfoliated clay in the first phase is a di-methyl tallowalkyl octyl ammonium methyl sulfate-exfoliated.

36. The method of claim 33, wherein the alkylamine-exfoliated or alkylammonium-exfoliated clay is present in the nanocomposite from 0.5 to 10 wt % based on the weight of the nanocomposite.

37. The method of claim 31, wherein the alkylammonium-exfoliated clay in the first phase is a di-methyl di-hydrogenated tallow alkyl ammonium chloride-exfoliated clay.

38. The method of claim 31, also comprising blending a curing agent with the first and second phases.

39. The method of claim 38, wherein the curing agent is selected from the group consisting of zinc, zinc stearate, stearic acid, sulfur, and mixtures thereof.

40. A tire innerliner comprising the nanocomposite obtained by curing the composition obtained from the method of claim 38.

41. The method of claim 31 wherein the first phase comprises the alkylammonium-exfoliated clay.

42. The method of claim 31 wherein the second phase comprises the alkylamine-exfoliated clay.

43. The method of claim 41 wherein the second phase comprises the alkylamine-exfoliated clay.

* * * * *